United States Patent
Yang et al.

(10) Patent No.: US 9,590,423 B2
(45) Date of Patent: Mar. 7, 2017

(54) POWER DISTRIBUTION SYSTEM LOSS REDUCTION WITH DISTRIBUTED ENERGY RESOURCE CONTROL

(75) Inventors: Fang Yang, Raleigh, NC (US); Xiaoming Feng, Cary, NC (US)

(73) Assignee: ABB Research Ltd., Zurich (CH)

( * ) Notice: Subject to any disclaimer, the term of this patent is extended or adjusted under 35 U.S.C. 154(b) by 1224 days.

(21) Appl. No.: 13/600,357

(22) Filed: Aug. 31, 2012

(65) Prior Publication Data
US 2014/0062426 A1 Mar. 6, 2014

(51) Int. Cl.
*H02J 3/18* (2006.01)

(52) U.S. Cl.
CPC ............. *H02J 3/18* (2013.01); *Y02E 40/30* (2013.01)

(58) Field of Classification Search
CPC ............. H02J 3/18; Y02E 40/30; G06F 1/26
See application file for complete search history.

(56) References Cited

U.S. PATENT DOCUMENTS

| | | |
|---|---|---|
| 4,365,190 A | 12/1982 | Pasternack et al. |
| 4,916,377 A | 4/1990 | Terada et al. |
| 5,081,591 A | 1/1992 | Hanway et al. |
| 5,422,561 A | 6/1995 | Williams et al. |
| 5,541,498 A | 7/1996 | Beckwith |
| 5,900,723 A | 5/1999 | Rostron |
| 7,343,360 B1 * | 3/2008 | Ristanovic ............. G06Q 30/08 705/412 |
| 7,460,931 B2 | 12/2008 | Jacobson |
| 8,195,338 B2 | 6/2012 | Feng et al. |
| 2010/0114400 A1 | 5/2010 | Feng et al. |

(Continued)

FOREIGN PATENT DOCUMENTS

EP 2397688 A1 12/2011

OTHER PUBLICATIONS

Kazari, H.; Fard, A.A.; Dobakhshari, A.S.; Ranjbar, A.M.: Voltage Regulation through Smart Utilization of Potential Reactive Power Resources, 2011, IEEE, Computer Modeling and Simulation (EMS), 2011 Fifth UKSim European Symposium on, Date of Conference Nov. 16-18, 2011, p. 293-298.*

(Continued)

*Primary Examiner* — Jung Kim
*Assistant Examiner* — James Evans
(74) *Attorney, Agent, or Firm* — Taft Stettinius & Hollister LLP

(57) ABSTRACT

A power distribution system has a plurality of reactive power resources including capacitor banks and distributed energy resources connected to branches of the power distribution system. Power loss is reduced in the distribution system by determining discrete switch states for the capacitor banks and continuous set points for the distributed energy resources, so that the reactive power provided by the reactive power resources reduces power loss while optionally correcting voltage violations in the power distribution system when the capacitor banks are set in accordance with the respective discrete switch states and the distributed energy resources are operated at the respective continuous set points. The range of values for the continuous set points is constrained based on maximum and minimum reactive power limits for each distributed energy resource under consideration.

22 Claims, 2 Drawing Sheets

(56) References Cited

U.S. PATENT DOCUMENTS

2011/0071695 A1* 3/2011 Kouroussis ............ H02J 3/1892
   700/295
2012/0133209 A1 5/2012 O'Brien et al.

OTHER PUBLICATIONS

Y. Zhu, K. Tomsovic. "Optimal Distribution Power Flow for Systems with Distributed Energy Resources." Electrical Power and Energy Systems, vol. 29. 2007. pp. 260-267.
Ayed A. S. Algarni, Kankar Bhattacharya. "Disco Operation Considering DG Units and Their Goodness Factor." IEEE Transactions on Power Systems, vol. 24, No. 4. IEEE. Nov. 2009. pp. 1831-1840.
Ayed A. S. Algarni, Kankar Bhattacharya. "Utility-Owned DG Units' Impacts on Distribution System Operation." Power Systems Conference and Exposition, 2009. IEEE. pp. 1-6.
T. Niknam, A. M. Ranjbar, A. R. Shirani. "Impact of Distributed Generation on Volt/Var Control in Distribution Networks." IEEE Power Tech Conference Proceedings, 2003. Bologna, Italy. pp. 1-7.
T. Niknam, A. M. Ranjbar, A. R. Shirani, A. Ostadi. "A New Approach Based on Ant Colony Algorithm to Distribution Management System with Regard to Dispersed Generation." 18th International Conference on Electricity Distribution, 2005. Session No. 4. pp. 1-5.
Uthen Leeton, Tossaphol Ratniyomchai, Thanatchai Kulworawanichpong. "Optimal Reactive Power Flow with Distributed Generating Plants in Electric Power Distribution Systems." International Conference on Advances in Energy Engineering, 2010. pp. 166-169.
J. J. Zhao, X. Li, J. T. Hao, C.L. Zhang, J.P. Lu. "Wind Farm Reactive Power Output Optimization for Loss Reduction and Voltage Profile Improvements." Power Electronics and Motion Control Conference, 2009. IPEMC. pp. 1099-1103.
Ferry A. Viawan, Daniel Karlsson. "Coordinated Voltage and Reactive Power Control in the Presence of Distribtued Generation." Conversion and Delivery of Electrical Energy in the 21st Century, 2008. IEEE. pp. 1-6.
Ferry A. Viawan, Daniel Karlsson. "Combined Local and Remote Voltage and Reactive Power Control in the Presence of Induction Machine DIstriuted Generation." IEEE Transactions on Power Systems, vol. 22, No. 4. Nov. 2007. IEEE. pp. 2003-2012.
M. Oshiro, T. Senju, A. Yona, N. Uraski, T. Funabashi, C. H. Kim. "Optimal Operation Strategy by Battery Energy Storage Systems in Distribution System." IPEC, 2010. IEEE. pp. 1199-1204.

* cited by examiner

POWER DISTRIBUTION SYSTEM LOSS REDUCTION WITH DISTRIBUTED ENERGY RESOURCE CONTROL

TECHNICAL FIELD

The instant application relates to power distribution systems, and more particularly to power loss reduction in such systems.

BACKGROUND

Distributed energy resources (DERs), also commonly referred to as distributed generation, distributed energy, and distributed power systems, are small, modular, decentralized, grid-connected or off-grid energy systems located in or near the place where energy is used. DERs are integrated systems that can include effective means of power generation, energy storage, and delivery. DERs include systems such as reciprocating engines (diesel, natural gas, dual-fuel, etc.), combustion turbines, micro-turbines, fuel cells, photovoltaic systems, concentrating solar systems, wind energy systems, small modular biopower systems, energy storage systems (e.g. flywheels), etc.

Many factors including environmental concerns, system expansion constraints, and technology enhancement in DERs have led to the progressive penetration of DERs in power distribution systems. DERs are able to provide energy at customer sites, and introduce new challenges in the optimization of power distribution system operation. In particular, many DERs have the capability to control their reactive power (var) output within a certain range, which offers new possibilities to control the reactive power flow in the electric power distribution network.

Reactive power flow is needed in an alternating-current power distribution system to support the transfer of real power over the network. The portion of power flow that is temporarily stored in the form of magnetic or electric fields, due to inductive and capacitive network elements, and then returned to the source, is the reactive power. Inductive devices absorb reactive power from the network, and capacitive devices inject reactive power into the network. DERs can absorb or inject reactive power, depending on operating conditions. Inductive devices, capacitive devices and DERs connected to a power distribution network are referred to herein as reactive power resources. Energy stored in reactive power resources gives rise to reactive power flow. Reactive power flow strongly influences the voltage levels across the network. The voltage levels and reactive power flow must be carefully controlled to allow a power distribution system to operate within acceptable limits.

In power distribution systems, power loss reduction is an important solution for improving system operation efficiency. Power loss reduction involves the control of available reactive power resources to optimize the reactive power flow in the network. The predominant reactive power resources available in traditional power distribution systems are switchable shunt capacitor banks. Most conventional power loss reduction solutions therefore focus on the control of the capacitor banks only. However, with the increasing penetration of DERs in power distribution networks, additional reactive power resources are available other than just switched capacitor banks. Compared to the discrete control of capacitors, the continuous control capability of DERs can further facilitate power loss reduction. Conventional power loss reduction solutions that do consider DERs in the power loss reduction analysis are based on very simplified network models and are verifiable only for small systems. It is difficult to predict the effectiveness of such solutions on a realistic utility-scale system.

SUMMARY

According to embodiments described herein, DER reactive power control is integrated into a centralized power loss reduction framework for electric power distribution systems. The electric power distribution network control centers or the distribution system substations can therefore facilitate power loss reduction using DERs.

According to an embodiment of a method of power loss reduction in a power distribution system having a plurality of reactive power resources including capacitor banks and distributed energy resources connected to branches of the power distribution system, the method comprises: determining discrete switch states for the capacitor banks and continuous set points for the distributed energy resources so that the reactive power provided by the reactive power resources reduces power loss in the power distribution system when the capacitor banks are set in accordance with the respective discrete switch states and the distributed energy resources are operated at the respective continuous set points; and constraining a range of values for the continuous set points based on maximum and minimum reactive power limits for each distributed energy resource under consideration.

According to an embodiment of a non-transitory computer-readable medium, the non-transitory computer-readable medium stores a computer program comprising program instructions to determine the discrete switch states for the capacitor banks and the continuous set points for the distributed energy resources, so that the reactive power provided by the reactive power resources reduces power loss in the power distribution system when the capacitor banks are set in accordance with the respective discrete switch states and the distributed energy resources are operated at the respective continuous set points. The computer program further comprises program instructions to constrain a range of values for the continuous set points based on maximum and minimum reactive power limits for each distributed energy resource under consideration.

According to an embodiment of a computer system in communication with the power distribution system, the computer system comprises a processing circuit operable to determine the discrete switch states for the capacitor banks and the continuous set points for the distributed energy resources so that the reactive power provided by the reactive power resources reduces power loss in the power distribution system when the capacitor banks are set in accordance with the respective discrete switch states and the distributed energy resources are operated at the respective continuous set points. The processing circuit is further operable to constrain a range of values for the continuous set points based on maximum and minimum reactive power limits for each distributed energy resource under consideration.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

Figure 1:
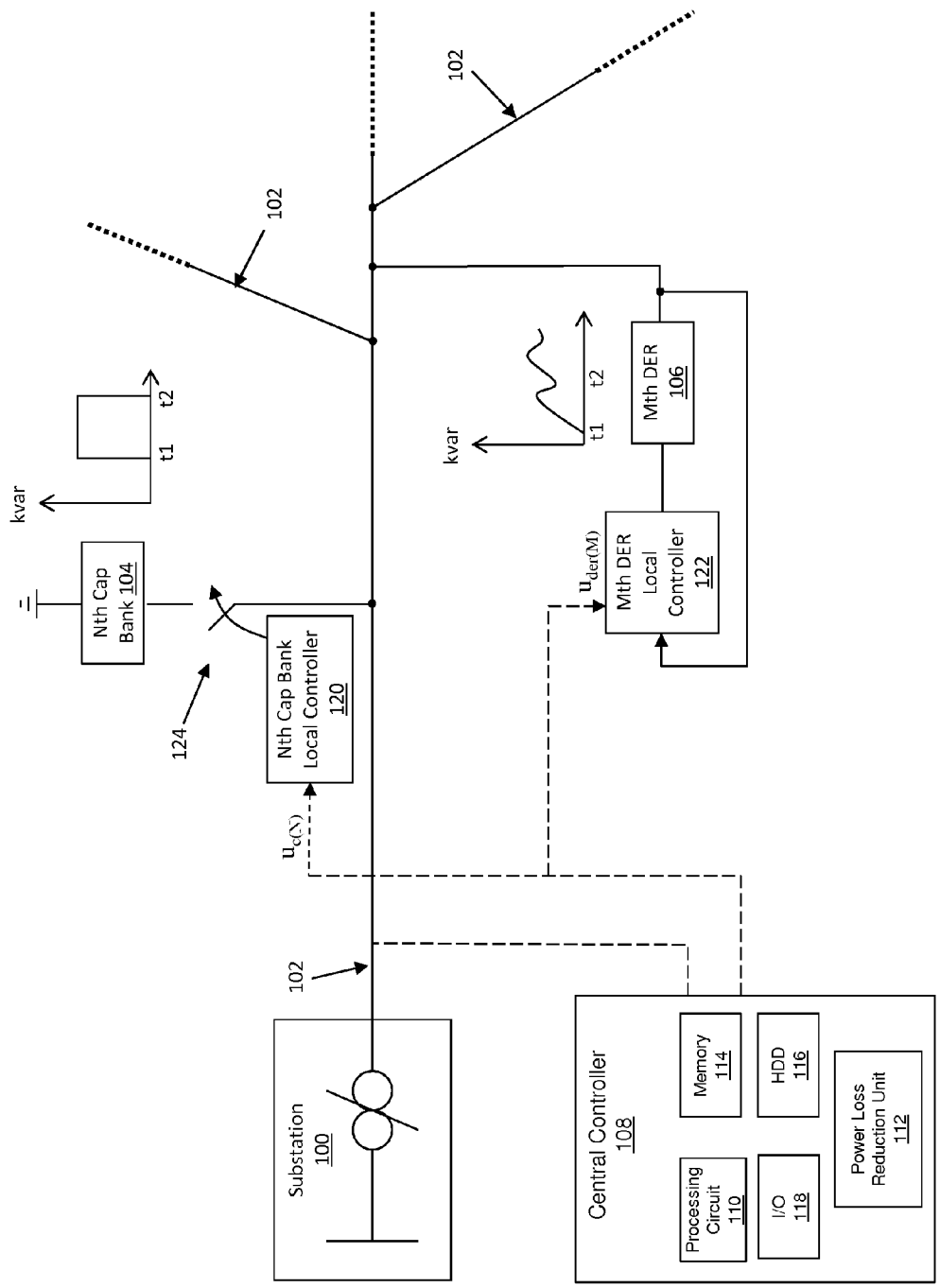
FIG. 1 illustrates a schematic diagram of a power distribution system including a control system for implementing power loss reduction based on DER reactive power control.

FIG. 1 illustrates a non-limiting exemplary embodiment of a power distribution system. The power distribution system has one or more substations 100 and a plurality of branches 102 connected to the substation(s) 100 for distributing power over the network. The power distribution system also includes a plurality of reactive power resources, including shunt capacitor banks 104 and distributed energy resources (DERs) 106 connected to the branches 102 of the power distribution system. Only the Nth capacitor bank 104, the Mth DER 106 and a single substation 100 are shown in FIG. 1 for ease of illustration only. In general, the power distribution system can include any suitable number of substations 100, capacitor banks 104 and DERs 106.

The DERs 106 are integrated systems that can include effective means of power generation, energy storage, and delivery. The DERs 106 can include systems such as, but not limited to, reciprocating engines (diesel, natural gas, dual-fuel, etc.), combustion turbines, micro-turbines, fuel cells, photovoltaic systems, concentrating solar systems, wind energy systems, small modular biopower, energy storage systems (e.g. flywheels), etc. DERs 106 having controllable reactive power are utilized in a centralized power loss reduction framework implemented by the power distribution system.

To this end, the power distribution system includes a central controller 108 for integrating the controllable DER reactive power into the centralized power loss reduction framework for the power distribution system. The power loss reduction framework achieves an optimized coordination among multiple capacitor banks 104 and DERs 106. The power loss reduction framework can also account for voltage correction by imposing node voltage constraints during the solution procedure. For example, flexible node voltage constraint representations can be introduced to meet different requirements from utilities. In addition, an approximate prescreening method is provided for excluding any noncritical node voltage constraints in order to improve the solution performance.

In more detail, the central controller 108 monitors and controls operation of the power distribution system, including power loss reduction and voltage correction. The central controller 108 can be connected to the power distribution system via a wired or wireless connection, as indicated by the dashed line connections shown in FIG. 1, or included in one of the substations 100. The central controller 108 includes a processing circuit 110 which can include digital and/or analog circuitry, such as one or more controllers, processors, ASICs (application-specific integrated circuits), etc. for executing program code which implements network control functions including power loss reduction and voltage correction. To this end, the central controller 108 includes a power loss reduction unit 112 included in or associated with the processing circuit 110 for implementing the power loss reduction and voltage correction procedures and corresponding calculations described herein. The central controller 108 also has memory 114, such as DRAM (dynamic random access memory), and an HDD (hard disk drive) 116 for storing the program code and related data processed and accessed by the processing circuit 110 and power loss reduction unit 112 during execution of the program code. The central controller 108 also has I/O (input/output) circuitry 118 for sending and receiving information, including communicating discrete switch states for the capacitor banks 104 to local controllers 120 of the capacitor banks 104. The I/O circuitry 118 also communicates continuous set points for the DERs 106 to local controllers 122 of the DERs 106. The discrete capacitor switch states and the continuous DER set points control the reactive power output of the capacitor banks 104 and DERs 106, respectively, and are determined as part of the power loss reduction framework as described in more detail later herein.

The controllable DERs 106 have a reactive power (var) output which can be controlled within a certain range, via the respective local controllers 122 connected to or integrated with the DERs 106. The central controller 108 utilizes the controllable nature of the DER reactive power when implementing centralized power loss reduction and voltage correction in the power distribution system. The capacitor banks 104 offer two discrete states of reactive power—all or nothing—which can be switched into the network by corresponding switches 124 under control of the respective local capacitor controller 120. The reactive power behavior of the Nth capacitor bank 104 is graphically illustrated in FIG. 1, where the reactive power is plotted in kvar (kilo-var) as a function of time. The switch state of the Nth capacitor bank 104 is changed at time t1, from OFF to ON, causing the Nth capacitor bank 104 to provide its' full reactive power capacity to the power distribution network (grid). The switch state of the Nth capacitor bank 104 is changed back to its previous state at time t2, from ON to OFF, removing the full reactive power capacity of the Nth capacitor bank 104 from the network.

In contrast, the controllable DERs 106 have continuous set points which yield a corresponding continuous reactive power response. The central controller 108, via the processing circuit 110 and power loss reduction unit 112, implements power loss reduction and voltage correction for the power distribution network in a more precise and accurate manner by accounting for and utilizing the continuous reactive power response of the DERs 106.

The capabilities of the DERs 106 to control reactive power output may be different. For example, DERs 106 using asynchronous generators or line-communicated converter interfacing with the grid cannot control their reactive power output, while DERs 106 using synchronous generators and self-commutated converters interfacing with the grid can be operated at any given power factor and therefore can be used to support reactive power.

Since power loss reduction is a steady state application in distribution management systems, only the steady state characteristics of the DERs 106 are of most interest. A general steady-state DER model is therefore adopted. That is, for a DER 106 having controllable reactive power, its reactive power output can vary (injecting/absorbing) in a certain range. This range can be determined by the DER maximum capacity, present real power output, and power factor limitation. More specifically, the following equations are used to calculate the maximum and minimum reactive power output for a DER 106 at a given time interval:

$$Q_{der}^{MAX} = \min\left\{\frac{P_{der}}{PF_{lag}^{lim}}\sqrt{1-(PF_{lag}^{lim})^2}, \sqrt{S_{der}^2 - P_{der}^2}\right\} \quad (1)$$

$$Q_{der}^{MIN} = \max\left\{-\frac{P_{der}}{PF_{lead}^{lim}}\sqrt{1-(PF_{lead}^{lim})^2}, -\sqrt{S_{der}^2 - P_{der}^2}\right\} \quad (2)$$

where $Q_{der}^{MAX}$: maximum DER var output
$Q_{der}^{MIN}$: minimum DER var output
$P_{der}$: maximum DER active power output at the given time interval
$PF_{lag}^{lim}$: DER power factor lagging limit ($PF_{lag}^{lim} \geq 0$)
$PF_{lead}^{lim}$: DER power factor leading limit ($PF_{lead}^{lim} \geq 0$)
$S_{der}$: DER maximum capacity In equations (1) and (2), the maximum/minimum reactive power output of a particular DER 106 at a given time interval does not result in an overload or power factor limitation violations. For some types of DERs 106 such as solar and wind, the real power output may vary during the given time interval and therefore the maximum estimate real power output should be used in the calculation. The maximum DER reactive power output is the minimum value of the two values determined by the lagging power factor limit $$\frac{P_{der}}{PF_{lag}^{lim}}\sqrt{1-(PF_{lag}^{lim})^2}$$

and the DER maximum capacity $\sqrt{S_{der}^2 - P_{der}^2}$. The minimum DER reactive power output is the maximum value of the two values determined by the leading power factor limit $$-\frac{P_{der}}{PF_{lead}^{lim}}\sqrt{1-(PF_{lag}^{lim})^2}$$

and the DER maximum capacity $-\sqrt{S_{der}^2 - P_{der}^2}$. A positive value means DER reactive power injection (into the network), and a negative value means DER reactive power absorption (from the network).

Reactive power control of the DERs 106 for power loss reduction and voltage correction is achieved based on an original power loss reduction framework, which is a centralized, detailed model-based online solution that optimizes the system reactive power flow by switching the capacitor banks 104 while meeting branch current magnitude constraints. To integrate DER reactive power control, the original optimization formulation is augmented to include continuous DER reactive power control variables as described in more detail later herein with regard to equations (7) through (16).

The original power loss formulation without DER reactive power control is described in equations (3) through (6). Control variables used include the discrete capacitor switching control variables ($u_c$) and continuous variables for real (d) and imaginary (q) branch current components $I_i^d$ and $I_i^q$. The discrete capacitor switching control variables ($u_c$) determine the switch state of the capacitor banks 104, e.g., $u_c=0$ or 1. The objective function represented by equation (3) is a quadratic power loss function. The power loss is calculated based on branch resistances ($r_i$) and the real and imaginary branch currents $I_i^d$ and $I_i^q$. The objective function is constrained by both linear constraints as represented by equations (4) and (5), and a quadratic constraint related to the branch currents as represented by equation (6).

$$\text{Min} f_{loss} = \sum_{i=1}^{n_b}\left\{(I_i^d)^2 + (I_i^q)^2\right\}*r_i \quad (3)$$

$$I_i^d = I_i^d(0) + \sum_{c=1}^{n_c} S_{u_c}^{I_i^d} * u_c \quad i=1,\ldots n_b \quad (4)$$

$$I_i^q = I_i^q(0) + \sum_{c=1}^{n_c} S_{u_c}^{I_i^q} * u_c \quad i=1,\ldots n_b \quad (5)$$

$$(I_i^d)^2 + (I_i^q)^2 \leq (I_i^{max})^2 \quad i=1,\ldots n_b \quad (6)$$

In these equations, $n_b$ is the number of circuit branches (lines and transformer legs) in the power distribution system, $$S_{u_c}^{I_i^d}$$

is a sensitivity value of the real current component of branch i with respect to the switching of capacitor bank c, $$S_{u_c}^{I_i^q}$$

is a sensitivity value of the imaginary current component of branch i with respect to the switching of capacitor bank c, $n_c$ is the number of controllable capacitor banks, $I_i^{max}$ is the current magnitude limit of branch i, and $u_c$ is the discrete capacitor switching variable for capacitor bank c. The sensitivity values can be determined by performing a sensitivity analysis, whereby the sensitivity of the branch currents is determined in response to the reactive power control states of the capacitor banks 104. The sensitivity values can be normalized by the perturbation size i.e. by the amount of reactive power provided by each capacitor bank 104 which can be switched in and out of the network by corresponding switches 124 under control of the respective local capacitor controller 120.

The original power loss formulation is augmented to include DER reactive power control as additional continuous control variables. The augmented formulation also includes voltage magnitude constraints for different nodes of the power distribution system. The voltage constraints enable the formulation to account for voltage correction while reducing power loss. For example, voltage constraint representations can be introduced to meet different requirements from utilities. In addition, an approximate prescreening method is described in more detail later herein which excludes any noncritical voltage magnitude variables and constraints in the augmented optimization formulation in order to improve the solution performance. The augmented power loss reduction formulation with additional continuous DER reactive power control variables and voltage magnitude constraints is given by:

$$\text{Min} f_{loss} = \sum_{i=1}^{n_b}\left\{(I_i^d)^2 + (I_i^q)^2\right\}*r_i + \sum_{k=1}^{n_{nd}}\{V_k^+ + V_k^-\}*w_k \quad (7)$$

where $I_i^d$ and $I_i^q$ are the real and imaginary branch currents, respectively, $n_b$ is the number of circuit branches (lines and transformer legs) in the network, $r_i$ is branch resistance, $n_{nd}$ and is the number of network nodes under consideration, $V_k^+$ and $V_k^-$ are slack variables associated with the voltage magnitude at node k, and $w_k$ is a weight coefficient for the voltage at node k.

The first part of the augmented power loss reduction formulation $$\sum_{i=1}^{n_b} \{(I_i^d)^2 + (I_i^q)^2\} * r_i,$$

minimizes power loss while the second part, $$\sum_{k=1}^{n_{nd}} \{V_k^+ + V_k^-\} * w_k,$$

ensures certain voltage magnitude constraints are satisfied at different nodes in the network. The augmented power loss reduction formulation achieves an optimized reactive power coordination among multiple capacitor banks 104 and DERs 106 while also implementing voltage correction by imposing voltage constraints during the solution procedure.

The power loss reduction objective function represented by equation (7) can be subject to the following linear branch current constraints:

$$I_i^d = I_i^d(0) + \sum_{u=1}^{n_u} S_u^{I_i^d} * u \quad i = 1, \ldots n_b \quad (8)$$

$$I_i^q = I_i^q(0) + \sum_{u=1}^{n_u} S_u^{I_i^q} * u \quad i = 1, \ldots n_b \quad (9)$$

to the following linear DER reactive power control constraint:

$$Q_{der}^{MIN} \leq Q_{der}(0) + u_{der} \leq Q_{der}^{MAX} \ der=1, \ldots n_{der} \quad (10)$$

to the following linear node voltage constraints:

$$V_k = V_k(0) - V_k^+ + V_k^- + \sum_{u=1}^{n_u} S_u^{V_k} * u \quad i = 1, \ldots n_d \quad (11)$$

$$V^{MIN} \leq V_k \leq V^{MAX} \quad \forall \ V^{MIN} \leq V_k(0) \leq V^{MAX} \quad (12)$$

$$V^{MIN} \leq V_k \leq V_k(0) \quad \forall \ V_k(0) > V^{MAX} \quad (13)$$

$$V_k(0) \leq V_k \leq V^{MAX} \quad \forall \ V^{MIN} > V_k(0) \quad (14)$$

$$0 \leq V_k^+, 0 \leq V_k^- \quad (15)$$

and to the following quadratic constraint:

$$(I_i^d)^2 + (I_i^q)^2 \leq (I_i^{max})^2 \ i=1, \ldots n_b \quad (16)$$

In equations (8) through (16), $$S_u^{I_i^d}$$

is the sensitivity value of the real current component $I_i^d$ of branch i calculated as a function of the discrete switching states change ($u_c$) of the capacitor banks 104 and the continuous set points change ($u_{der}$) of the DERs 106, $$S_u^{I_i^q}$$

is the sensitivity value of the imaginary current $I_i^q$ component of branch i calculated as a function of the discrete switching states change ($u_c$) of the capacitor banks 104 and the continuous set points change ($u_{der}$) of the DERs 106, u represents the control variables for both the discrete switch states ($u_c$) for the capacitor banks 104 and the continuous set points ($u_{der}$) for the DERs 106, $n_u$ is the number of total controllable variables (capacitor banks 104 and DERs 106 with controllable reactive power), and $n_{der}$ is the number of controllable DERs 106. Also, $Q_{der}(0)$ is the reactive power output of the DERs 106 at the base case, $Q_{der}^{MAX}$ is the upper limit of the reactive power output by the DERs 106 as given by equation (1), $Q_{der}^{MIN}$ is the lower limit of the reactive power output by the DERs 106 as given by equation (2), $V_k$ is the voltage magnitude at node k, $V_k(0)$ is the present voltage magnitude at node k for the base case, $V^{MAX}$ is the voltage magnitude upper limit, and $V^{MIN}$ is the voltage magnitude lower limit.

Compared to the original formulation given by equation (3), the augmented formulation having the objective function given by equation (7) is modified to include voltage correction terms in accordance with the first part of equation (7), $$\sum_{i=1}^{n_b} \{(I_i^d)^2 + (I_i^q)^2\} * r_i,$$

and constrained by DER reactive power variables represented by the DER continuous set points which have a range of values limited by the maximum and minimum reactive power limits $Q_{der}^{MAX}$, $Q_{der}^{MIN}$ for each DER 106 under consideration as given by equation (10). This way, more precise reactive power adjustments can be made by determining the appropriate continuous set points for the DERs 106, which in conjunction with the discrete capacitor switch states, more optimally reduce power loss within the power distribution system. According to the branch current constraints represented by equations (8) and (9) and the DER reactive power constraints represented by equation (10), the calculation of the original branch currents as given by equations (4) and (5) are extended to account for the impact of DER reactive power output change on the real and imaginary branch currents.

Figure 2:
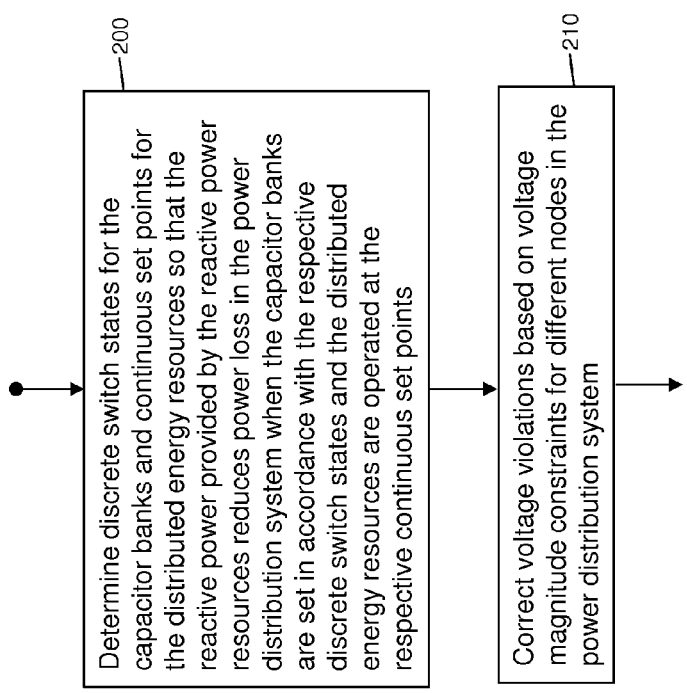
FIG. 2 illustrates a flow diagram of an embodiment of a method of power loss reduction in a power distribution system based on DER reactive power control.

FIG. 2 illustrates an embodiment of a method of implementing the augmented power loss reduction formulation by the central controller 108 with support from the power loss reduction unit 112. The discrete switch states for the capacitor banks 104 and the continuous set points for the DERs 106 are determined in accordance with the first part of the augmented power loss reduction formulation, $$\sum_{i=1}^{n_b} \{(I_i^d)^2 + (I_i^q)^2\} * r_i,$$

so that the reactive power provided by the reactive power resources (capacitor banks 104 and DERs 106) reduces power loss in the power distribution system when the capacitor banks 104 are set in accordance with the respective discrete switch states (0 or 1) and the DERs 106 are operated at the respective continuous set points (Block 200).

The range of continuous set points available for selection can be limited by equation (10). That is, the range of values for the DER continuous set points can be constrained to yield reactive power $Q_{der}(0)+u_{der}$ within the maximum and minimum limits $Q_{der}^{MAX}$, $Q_{der}^{MIN}$ for each DER 106 under consideration. In addition, the real and imaginary branch currents $I_i^d$ and $I_i^q$ account for the effect of the reactive power provided by the reactive power resources (capacitor banks 104 and DERs 106) on the real and imaginary branch currents as given by equations (8) and (9).

Power loss reduction can be further limited to correct voltage violations based on voltage magnitude constraints for different nodes in the power distribution system in accordance with the second part of the augmented power loss reduction formulation, $$\sum_{k=1}^{n_{nd}} \{V_k^+ + V_k^-\} * w_k$$

(Block 210). The weight coefficient $w_k$ can vary according to the importance of the node voltage. In one embodiment, the voltage magnitude constraints $V_k^+$, $V_k^-$ for lower priority nodes are weighted less than the voltage magnitude constraints for higher priority nodes. Any desired node in the power distribution system can have such voltage constraints. The priority of the nodes can be determined as desired e.g. by location in the network, etc.

Power loss reduction optimization can be limited because of the voltage magnitude constraints so that a preexisting voltage magnitude violation at any of the nodes is not worsened as a result of the power loss reduction process, and no new voltage magnitude violations occur at any of the nodes as a result of the power loss reduction process. This way, utilities can accept the network voltage conditions regardless of violations before running the loss reduction application, and only require that the power loss reduction process not worsen the voltage profile. According to this embodiment, the objective is to reduce power loss while not making the existing voltage profile worse. For example, if a voltage violation already exists at a node prior to the power loss reduction process, then the process should not cause the voltage violation to worsen. If no voltage violation exists at a node, then the power loss reduction process should not introduce a new voltage violation at the node or any other node. Table 1 below illustrates three cases before and after the power loss reduction process is performed, where $V_k^{before}$ is the voltage at node k before the power loss reduction process is performed and $V_k^{after}$ is the node k voltage after the process is performed. The voltage constraints $V^{MIN}$, $V^{MAX}$ to achieve this objective are shown in equations (12) through (14).

TABLE 1

|  | Before Loss Reduction | After Loss Reduction |
|---|---|---|
| Case 1 | $V^{MIN} \leq V_k^{before} \leq V^{MAX}$ | $V^{MIN} \leq V_k^{after} \leq V^{MAX}$ |
| Case 2 | $V_k^{before} > V^{MAX}$ | $V^{MIN} \leq V_k^{after} \leq V_k^{before}$ |
| Case 3 | $V_k^{before} < V^{MIN}$ | $V_k^{before} \leq V_k^{after} \leq V^{MAX}$ | where k=1, ... $n_{nd}$.

In another embodiment, the power loss reduction formulation can be limited because of the voltage magnitude constraints so that a preexisting voltage magnitude violation at any of the nodes is eliminated while performing the power loss reduction. This way, utilities can correct existing voltage violations while the power loss reduction process is performed and the voltage profile can be improved after the loss reduction process. As such, the first priority is to eliminate voltage violations. Power loss reduction is achieved only if the control actions for voltage correction and power loss reduction do not contradict to each other. The voltage constraints for this embodiment are represented by equation (17) below, which would replace the voltage constraints given by equations (12) through (14) in this particular embodiment:

$$V^{MIN} \leq V_k \leq V^{MAX} \quad k=1, \ldots n_{nd} \tag{17}$$

The introduction of voltage magnitude variables and related constraints increases the optimization problem dimension and complexity, which can influence the solution performance. The solution performance can be further optimized by disregarding noncritical voltage magnitude variables and constraints from the optimization function of equation (7).

Noncritical voltage magnitude variables and constraints can be identified based on three factors. The first factor is the sensitivity value of the voltage magnitude ($V_k$) with respect to capacitor switching ($S_{u_c}^{V_k}$) and DER reactive power output change ($S_{u_{der}}^{V_k}$). The second factor is the present value of the voltage magnitude ($V_k(0)$). The third factor is the available control actions ($u_c$ and $u_{der}$).

Regarding the available control action for a controllable capacitor bank 104, if the present capacitor bank status is on, then that bank 104 can only be turned off, i.e., the available control actions ($u_c$) is switching off (e.g. $u_c=-1$). Otherwise, if the present capacitor bank status is off, then the bank 104 can only be turned on, i.e., the available control action for this capacitor bank 104 is switching on ($u_c=1$).

Regarding the available control action for the reactive power output of a DER 106, the present DER reactive power output can be assumed to be $Q_{der}(0)$, and its maximum and minimum reactive power output limits are $Q_{der}^{MAX}$ and $Q_{der}^{MIN}$, respectively, as given by equations (1) and (2). The available control actions ($u_{der}$) for a DER 106 include increasing or decreasing its reactive power output. The sensitivity value of the voltage magnitude with respect to DER reactive power output change is positive (i.e., if DER reactive power output increases, then the voltage magnitude increases, and if DER reactive power output decreases, the voltage magnitude decreases). Thus when considering whether to increase/decrease the DER reactive power outputs to their maximum/minimum reactive power output limits ($Q_{der}^{MAX}/Q_{der}^{MIN}$), the estimated maximum/minimum node voltage magnitudes can be calculated based on these sensitivity values. If the resulting estimated maximum/minimum voltage magnitudes do not exceed the voltage upper/lower limits ($V^{MAX}/V^{MIN}$), then this voltage magnitude and its relevant constraints can be identified as noncritical and therefore excluded from the objective function if desired.

Described next is an embodiment of a process for disregarding noncritical voltage magnitude variables and constraints from the augmented power loss reduction formulation.

Loop through all available control actions ($u_c$ and $u_{der}$) for the capacitor banks 104 and the DERs 106 as follows:
For each control action, loop through all node voltages:

---
If $(S_{u_c}^{i^k} * u_c > 0)$ or $(S_{u_{der}}^{i^k} * (Q_{der}^{MAX} - Q_{der}(0)) > 0)$
  $\Delta V_k^+ = S_{u_c}^{i^k} * u_c$ or $\Delta V_k^+ = S_{u_{der}}^{i^k} * (Q_{der}^{MAX} - Q_{der}(0))$
  Accumulate the voltage increase amount ($\Sigma \Delta V_k^+$)
If $(S_{u_c}^{i^k} * u_c < 0)$ or $(S_{u_{der}}^{i^k} * (Q_{der}^{MIN} - Q_{der}(0)) < 0)$
  $\Delta V_k^- = S_{u_c}^{i^k} * u_c$ or $\Delta V_k^- = S_{u_{der}}^{i^k} * (Q_{der}^{MIN} - Q_{der}(0))$
  Accumulate the voltage decrease amount ($\Sigma \Delta V_k^-$)
End Loop
End Loop

---

Then loop through all node voltages as follows:

---
If $(V_k(0) + \Sigma \Delta V_k^+) < V^{MAX}$ and $(V_k(0) - \Sigma \Delta V_k^-) > V^{MIN}$
  $V_k$ is identified as a noncritical control variable
  $V^{MIN} \leq V_k \leq V^{MAX}$ is identified as a noncritical constraint
If $(V_k(0) + \Sigma \Delta V_k^+) < V^{MAX}$ and $(V_k(0) - \Sigma \Delta V_k^-) < V^{MIN}$ )
  $V_k \leq V^{MAX}$ is identified as a noncritical constraint
If $(V_k(0) + \Sigma \Delta V_k^+) > V^{MAX}$ ) and ( $(V_k(0) - \Sigma \Delta V_k^-) > V^{MIN}$ )
  $V^{MIN} \leq V_k$ is identified as a noncritical constraint
End Loop

---

This prescreening procedure estimates the voltage magnitude under worst-case capacitor and DER control combination scenarios, i.e. each capacitor bank is on or off, and each DER is at its maximum ($Q_{der}^{MAX}$) or minimum ($Q_{der}^{MIN}$) allowed reactive power output.

According to one embodiment, one or more of the voltage magnitude constraints is disregarded for a particular node if a change in the discrete capacitor switch states ($u_c$) from one state (0 or 1) to the other state (1 or 0) and a change in the continuous DER set points ($u_{der}$) from the present value $Q_{der}(0)$ to the minimum or maximum limit ($Q_{der}^{MIN}$ or $Q_{der}^{MAX}$) result in a cumulative voltage ($V_k(0)+\Sigma\Delta V_k^+$ or $V_k(0)-\Sigma\Delta V_k^-$) at that node within the predetermined minimum and/or maximum limits ($V^{MAX}/V^{MIN}$) for that node. For example, the maximum voltage magnitude constraint $V_k \leq V^{MAX}$ for node k is disregarded if a change in the discrete capacitor switch states and a change in the continuous DER set points result in a cumulative voltage at node k which does not violate the predetermined maximum limit $V^{MAX}$. In a similar manner, the minimum voltage magnitude constraint $V^{MIN} \leq V_k$ for node k is disregarded if a change in the discrete capacitor switch states and a change in the continuous DER set points result in a cumulative voltage at node k which does not violate the predetermined minimum limit $V^{MIN}$.

The power loss reduction embodiments described herein integrate DER reactive power control into a traditional capacitor control-based centralized network model-based online loss reduction solution to further facilitate reducing system loss, and are applicable to utility-scale distribution systems. An optimized coordination among multiple capacitors and DER reactive power control is implemented. The impact of capacitor and DER reactive power control on system node/bus voltage can be accounted for, and can include voltage constraints in the solution. Flexible voltage constraint representations allow utilities to reduce loss and/or correct voltage violation according to the requirement. The solution efficiency can be improved by disregarding noncritical constraints.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of power loss reduction in a power distribution system having a plurality of reactive power resources including capacitor banks and distributed energy resources connected to branches of the power distribution system, the method comprising:
  determining discrete switch states for the capacitor banks and continuous set points for the distributed energy resources that control the reactive power output of the capacitor banks and distributed energy resources, respectively, using a mixed integer formulation and a mixed integer programming solver, so that the reactive power provided by the reactive power resources reduces power loss in the power distribution system when the capacitor banks are set in accordance with the respective discrete switch states and the distributed energy resources are operated at the respective continuous set points, wherein a power loss of the capacitor banks is based on branch resistances and real and imaginary branch currents that account for reactive power output changes of the distributed energy resources;
  constraining a range of values for the continuous set points based on maximum and minimum reactive power limits for each distributed energy resource under consideration; and
  controlling the reactive power output of the capacitor banks and the distributed energy resources based on the determined discrete switch states for the capacitor banks and continuous set points for the distributed energy resources.

2. The method according to claim 1, wherein the power loss in the power distribution system is reduced as a function of the discrete switch states for the capacitor banks, the continuous set points for the distributed energy resources, branch resistances, real branch currents, and imaginary branch currents.

3. The method according to claim 1, further comprising correcting voltage violations based on voltage magnitude constraints for different nodes in the power distribution system.

4. The method according to claim 3, wherein the voltage violations are corrected based on the voltage magnitude constraints so that a preexisting voltage magnitude violation at any of the nodes is not worsened as a result of the power loss reduction and no new voltage magnitude violations occur at any of the nodes as a result of the power loss reduction.

5. The method according to claim 3, wherein the voltage violations are corrected based on the voltage magnitude constraints so that a preexisting voltage magnitude violation at any of the nodes is eliminated while performing the power loss reduction.

6. The method according to claim 3, further comprising weighting the voltage magnitude constraints.

7. The method according to claim 6, wherein the voltage magnitude constraints for lower priority nodes are weighted less than the voltage magnitude constraints for higher priority nodes.

8. The method according to claim 3, further comprising disregarding one or more of the voltage magnitude constraints for a node if a change in the discrete switch states from one state to another state for the capacitor banks and a change in the continuous set points from a present value to the maximum or minimum reactive power limit for the distributed energy resources result in a cumulative voltage at that node which is within predetermined minimum and maximum limits.

9. The method according to claim 8, wherein a maximum voltage magnitude constraint for a node is disregarded if the change in the discrete switch states for the capacitor banks and the change in the continuous set points for the distributed energy resources result in the cumulative voltage at that node not violating the predetermined maximum limit, and wherein a minimum voltage magnitude constraint for a node is disregarded if the change in the discrete switch states for the capacitor banks and the change in the continuous set points for the distributed, energy resources result in the cumulative voltage at that node not violating the predetermined minimum limit.

10. The method according to claim 1, further comprising:
communicating the discrete switch states for the capacitor banks from a central controller of the power distribution system to local controllers of the capacitor banks and;
communicating the continuous set points for the distributed energy resources from the central controller to local controllers of the distributed energy resources.

11. A non-transitory computer-readable medium storing a computer program operable to implement power loss reduction in a power distribution system having a plurality of reactive power resources including capacitor banks and distributed energy resources connected to branches of the power distribution, system, the computer program comprising:
program instructions to determine discrete switch states for the capacitor banks and continuous set points for the distributed energy resources that control the reactive power output of the capacitor banks and distributed energy resources, respectively, using a mixed integer formulation and a mixed integer programming solver, so that the reactive power provided by the reactive power resources reduces power loss in the power distribution system when the capacitor banks are set in accordance with the respective discrete switch states and the distributed energy resources are operated at the respective continuous set points, wherein a power loss of the capacitor banks is based on branch resistances and real and imaginary branch currents that account for reactive power output changes of the distributed energy resources;
program instructions to constrain a range of values for the continuous set points based on maximum and minimum reactive power limits for each distributed energy resource under consideration; and
program instructions to control the reactive power output of the capacitor banks and the distributed energy resources based on the determined discrete switch states for the capacitor banks and continuous set points for the distributed energy resources.

12. The non-transitory computer readable medium according to claim 11, further comprising program instructions to correct voltage violations based on voltage magnitude constraints for different nodes in the power distribution system.

13. The non-transitory computer readable medium according to claim 12, further comprising program instructions to weight the voltage magnitude constraints so that lower priority nodes are weighted less than the voltage magnitude constraints for higher priority nodes.

14. The non-transitory computer readable medium according to claim 12, further comprising program instructions to disregard one or more of the voltage magnitude constraints for a node if a change in the discrete switch states from one state to another state for the capacitor banks and a change in the continuous set points from a present value to the maximum or minimum reactive power limit for the distributed energy resources result in a cumulative voltage at that node which is within predetermined minimum and maximum limits.

15. A computer system configured to communicate with a power distribution system having a plurality of reactive power resources including capacitor banks and distributed energy resources connected to branches of the power distribution system, the computer system comprising a processing circuit operable to:
determine discrete switch states for the capacitor banks and continuous set points for the distributed energy resources that control the reactive power output of the capacitor banks and distributed energy resources, respectively, using a mixed integer formulation and a mixed integer programming solver, so that the reactive power provided by the reactive power resources reduces power loss in the power distribution system when the capacitor banks are set in accordance with the respective discrete switch states and the distributed energy resources are operated at the respective continuous set points, wherein a power toss of the capacitor banks is based on branch resistances and real and imaginary branch currents that account for reactive power output changes of the distributed energy resources;
constrain a range of values for the continuous set points based on maximum and minimum reactive power limits for each distributed energy resource under consideration; and
control the reactive power output of the capacitor banks and the distributed energy resources based on the determined discrete switch states for the capacitor banks and continuous set points for the distributed energy resources.

16. The computer system according to claim 15, wherein the processing circuit is further operable to correct voltage violations based on voltage magnitude constraints for different nodes in the power distribution system.

17. The computer system according to claim 16, wherein the processing circuit is operable to correct the voltage violations based on the voltage magnitude constraints so that a preexisting voltage magnitude violation at any of the nodes is not worsened as a result of the power loss reduction and no new voltage magnitude violations occur at any of the nodes as a result of the power loss reduction.

18. The computer system according to claim 16, wherein, the processing circuit is operable to correct the voltage violations based on the voltage magnitude constraints so that a preexisting voltage magnitude violation at any of the nodes is eliminated, while performing the power loss reduction.

19. The computer system according to claim 16, wherein the processing circuit is further operable to weight the voltage magnitude constraints so that the voltage magnitude constraints for lower priority nodes are weighted less than the voltage magnitude constraints for higher priority nodes.

20. The computer system according to claim 16, wherein the processing circuit is further operable to disregard one or more of the voltage magnitude constraints for a node if a change in the discrete switch states from one state to another state for the capacitor banks and a change in the continuous set points from a present value to the maximum or minimum reactive power limit for the distributed energy resources result in a cumulative voltage at that node which is within predetermined minimum and maximum limits.

21. The computer system according to claim 20, wherein the processing circuit is operable to disregard a maximum voltage magnitude constraint for a node if the change in the discrete switch states for the capacitor banks and the change in the continuous set points for the distributed energy resources result in the cumulative voltage at that node not violating the predetermined maximum limit, and wherein the processing circuit is operable to disregard a minimum voltage magnitude constraint for a node if the change in the discrete switch states for the capacitor banks and the change in the continuous set points for the distributed energy resources result in the cumulative voltage at that node not violating the predetermined minimum limit.

22. The computer system according to claim 15, wherein the processing circuit is further operable to communicate the discrete switch states for the capacitor banks to local controllers of the capacitor banks and communicate the continuous set points for the distributed energy resources to local controllers of the distributed energy resources.

* * * * *